United States Patent
Yamashita et al.

(10) Patent No.: US 8,613,589 B2
(45) Date of Patent: Dec. 24, 2013

(54) THERMAL INSULATION STRUCTURE FOR STRUCTURAL MEMBER, AND SCROLL STRUCTURE

(75) Inventors: Shoki Yamashita, Tokyo (JP); Toshihiro Inoue, Tokyo (JP)

(73) Assignees: Pebble Bed Modular Reactor (Pty) Limited, Centurion (ZA); Mitsubishi Heavy Industries, Ltd., Tokyo (JP)

( * ) Notice: Subject to any disclaimer, the term of this patent is extended or adjusted under 35 U.S.C. 154(b) by 653 days.

(21) Appl. No.: 12/747,285

(22) PCT Filed: Mar. 27, 2009

(86) PCT No.: PCT/JP2009/056930
§ 371 (c)(1),
(2), (4) Date: Jul. 27, 2010

(87) PCT Pub. No.: WO2009/123302
PCT Pub. Date: Oct. 8, 2009

(65) Prior Publication Data
US 2010/0316491 A1 Dec. 16, 2010

(30) Foreign Application Priority Data
Mar. 31, 2008 (JP) ................. 2008-093739

(51) Int. Cl.
*F01D 25/26* (2006.01)

(52) U.S. Cl.
USPC ........... 415/134; 415/135; 415/138; 415/178; 415/206

(58) Field of Classification Search
USPC ......... 415/134, 135, 138, 176, 177, 178, 203, 415/204, 206
See application file for complete search history.

(56) References Cited

U.S. PATENT DOCUMENTS

| | | | | |
|---|---|---|---|---|
| 2,625,013 A | * | 1/1953 | Howard et al. | 415/138 |
| 3,196,611 A | * | 7/1965 | Henny | 60/39.512 |
| 3,321,179 A | * | 5/1967 | Johnson et al. | 415/136 |
| 4,083,180 A | * | 4/1978 | Thompson et al. | 415/177 |
| 4,543,039 A | * | 9/1985 | Ruis et al. | 415/190 |
| 5,403,150 A | * | 4/1995 | McEachern et al. | 415/177 |
| 5,618,162 A | * | 4/1997 | Chan et al. | 415/206 |
| 5,662,457 A | | 9/1997 | Bechtel et al. | |

FOREIGN PATENT DOCUMENTS

| | | |
|---|---|---|
| CN | 1326668 A | 12/2001 |
| DE | 3042971 A1 | 6/1982 |
| DE | 102004018987 A1 | 11/2005 |
| EP | 0 069 698 A2 | 1/1983 |

(Continued)

OTHER PUBLICATIONS

Japanese Office Action dated Jul. 19, 2011, issued in corresponding Japanese Patent Application No. 2010-524004.
Russian Office Action dated Dec. 27, 2011, issued in corresponding Russian Patent Application No. 2010125912.
Russian Office Action mailed Jul. 4, 2012, issued in corresponding Russian Patent Application No. 2010125912 (7 pages).
International Search Report of PCT/JP2009/056930, mailing date Jul. 2, 2010.
Chinese Office Action dated Aug. 16, 2013, issued in corresponding Chinese Patent Application No. 200980101430.X, w/ English translation.

*Primary Examiner* — Igor Kershteyn
(74) *Attorney, Agent, or Firm* — Westerman, Hattori, Daniels & Adrian, LLP

(57) ABSTRACT

To provide a thermal insulation structure for a structural member and a scroll structure which can be easily used even in integrally constructed structural members and which can ensure reliability and thermal insulation properties. Provided are securing portions (52 and 53) extending outward from an outer wall of the structural member; a press plate (55) attached to the securing portions (52 and 53), with a gap between the press plate and the outer wall; and a thermal insulation member (56) disposed between the outer wall and the press plate (55).

6 Claims, 4 Drawing Sheets

(56) References Cited

FOREIGN PATENT DOCUMENTS

| | | |
|---|---|---|
| GB | 679916 A | 9/1952 |
| GB | 1220175 A | 1/1971 |
| JP | 1-117929 A | 5/1989 |
| JP | 9-014576 A | 1/1997 |
| JP | 2792990 B2 | 9/1998 |
| JP | 2004-308502 A | 11/2004 |
| SU | 1189962 A | 11/1985 |

* cited by examiner

THERMAL INSULATION STRUCTURE FOR STRUCTURAL MEMBER, AND SCROLL STRUCTURE

TECHNICAL FIELD

The present invention relates to a thermal insulation structure for a structural member and a scroll structure in a turbine such as a steam turbine or a gas turbine used in a rotary machine.

BACKGROUND ART

Generally, a scroll structure used in a turbine is a structural member which is disposed in front of a first stator blade (inflow side of working fluid) or is disposed behind a last rotor blade (outflow side of working fluid) in the turbine using high temperature steam or high temperature gas as the working fluid, and the working fluid flows through the scroll structure. The scroll structure is formed by sheet-metal welding or casting.

Among the scroll structures, in the scroll structure through which heated working fluid flows in or out, in order to satisfy material strength required for the scroll structure, an outer peripheral surface of the scroll structure is sprayed with cooling fluid to lower the temperature of the scroll structure.

It is necessary to construct a thermal insulation structure for preventing the temperature of the scroll structure from rising or for preventing heat of working fluid flowing through the scroll structure from being radiated or absorbed, but it is also known to attach a thermal insulation material inside the structural member to block heat (see Japanese Unexamined Patent Application, Publication No. H9-14576 for example).

However, according to the thermal insulation structure described in Japanese Unexamined Patent Application, Publication No. H9-14576, it is not assumed that the thermal insulation structure is formed into a three-dimensional shape like the scroll structure, and there is a problem that it is difficult to construct such a thermal insulation structure.

In the above thermal insulation structure, an outer casing constituting the structural member and an inner wall which pushes a heat insulator against the outer casing are fixed to each other. Therefore, when a thermal extension amount of the outer casing and a thermal extension amount of the inner wall are different from each other, a difference between the thermal extension amounts is not absorbed, and there is an adverse possibility that the thermal insulation structure is damaged.

Since a thermal insulation material is disposed between shelves which are fixed to the outer casing by welding, there is a problem that the shelves are required to be disposed in order to construct the thermal insulation structure.

The thickness of the above thermal insulation structure is determined by the height of the shelves, and there is thus a problem that it is difficult to adjust the thickness of the thermal insulation structure.

When cooling fluid is sprayed to lower the temperature of the scroll structure, a system for supplying the cooling fluid is separately required. Extracted working fluid is used as the cooling fluid in many cases, and there is a problem that efficiency of a turbine having the scroll structure or a plant having the turbine is deteriorated although the efficiency differs depending upon the temperature condition or structure condition.

When the thermal insulation structure is provided on an inner surface of the scroll structure, a portion of the thermal insulation structure is peeled off and drops, and flows into a row of blades of the turbine portion disposed downstream due to flow of the working fluid, which damages a rotor blade or a stator blade, and the thickness of a tube is reduced due to erosion in some cases.

DISCLOSURE OF INVENTION

The present invention has been accomplished to solve the above problems, and it is an object of the present invention to provide a thermal insulation structure for a structural member and a scroll structure which can be easily used even in integrally constructed structural members and which can ensure reliability and thermal insulation properties.

In order to achieve the above objects, the present invention provides the following solutions.

According to the present invention, a thermal insulation structure for a structural member includes: a securing portion extending outward from an outer wall of the structural member; a press plate attached to the securing portion, with a gap between the press plate and the outer wall; and a thermal insulation member disposed between the outer wall and the press plate.

According to the present invention, the thermal insulation member is disposed outside the structural member, and the outer wall of the structural member and the press plate sandwich the thermal insulation member. Therefore, as compared with a case where the thermal insulation structure is disposed inside the structural member, it becomes easy to attach the thermal insulation structure. Further, since the working fluid flowing through the scroll structure and the thermal insulation structure do not come into contact with each other, drop of the thermal insulation structure caused by flow of the working fluid can be prevented.

A distance between the press plate and the outer wall of the structural member is adjusted by adjusting the position of the press plate mounted with respect to the securing portion, and it becomes easy to adjust the thickness of the thermal insulation structure.

An example of the structural member is a scroll structure of a turbine such as a steam turbine or a gas turbine used in a rotary machine.

In the above-described thermal insulation structure according to the present invention, it is preferable that an adjusting portion, disposed between the outer wall and the press plate, be provided for defining the gap between the outer wall and the press plate by supporting the press plate from the outer wall side thereof.

According to this configuration, since the distance between the outer wall and the press plate can easily be determined, it becomes easier to adjust the thickness of the thermal insulation structure. That is, the distance between the outer wall and the press plate can easily be determined by disposing the adjusting portion on the outer wall, disposing the press plate outside the adjusting portion, and bringing the press plate into abutment against the adjusting portion.

By providing the plurality of same adjusting portions, the distances between the press plates and the outer wall at the location where the adjusting portions are disposed can be equally set.

In the above-described thermal insulation structure according to the present invention, it is preferable that further included be a plurality of press plates each having a configuration equal to that of the above press plate, and that the plurality of press plates be disposed with ends thereof separated from each other and be capable of moving relative to each other in the direction in which the press plates extend.

According to this configuration, even in a case where there is a difference in thermal extension amounts between the plurality of press plates, the difference between the thermal extension amounts can be absorbed by the location where ends of the press plates are separated from each other.

Further, even in a case where there is a difference between the thermal extension amount of the structural member and the thermal extension amount of the press plate, the difference in thermal extension amounts is absorbed by the overlapped portion of the press plates.

In the above-described thermal insulation structure according to the present invention, it is preferable that further included be a partition plate extending toward the outside from the outer wall of the structural member.

According to this configuration, since the gap where the thermal insulation member is disposed is defined by the partition plate, movement or deviation caused by the weight of the thermal insulation member of its own are suppressed.

According to the present invention, a scroll structure includes: a scroll having a channel through which a working fluid flows in the interior thereof; and a thermal insulation structure according to the present invention.

The thermal insulation structure is prevented from dropping by using the thermal insulation structure of the present invention. Therefore, reliability and thermal insulation properties of the scroll structure are ensured. Further, since the thickness of the thermal insulation structure is easily adjusted, the thermal insulation properties of the scroll structure are ensured.

According to the thermal insulation structure for the structural member and the scroll structure of the present invention, the thermal insulation member is disposed outside the structural member, and the outer wall of the scroll structure and the press plate sandwich the thermal insulation member. Therefore, there is an effect that the thermal insulation structure and the scroll structure can be easily used even in integrally constructed structural members, and reliability and thermal insulation properties can be ensured.

BEST MODE FOR CARRYING OUT THE INVENTION

A thermal insulation structure and a gas turbine having a scroll structure according to an embodiment of the present invention will be described with reference to FIGS. 1 to 5.

Figure 1:
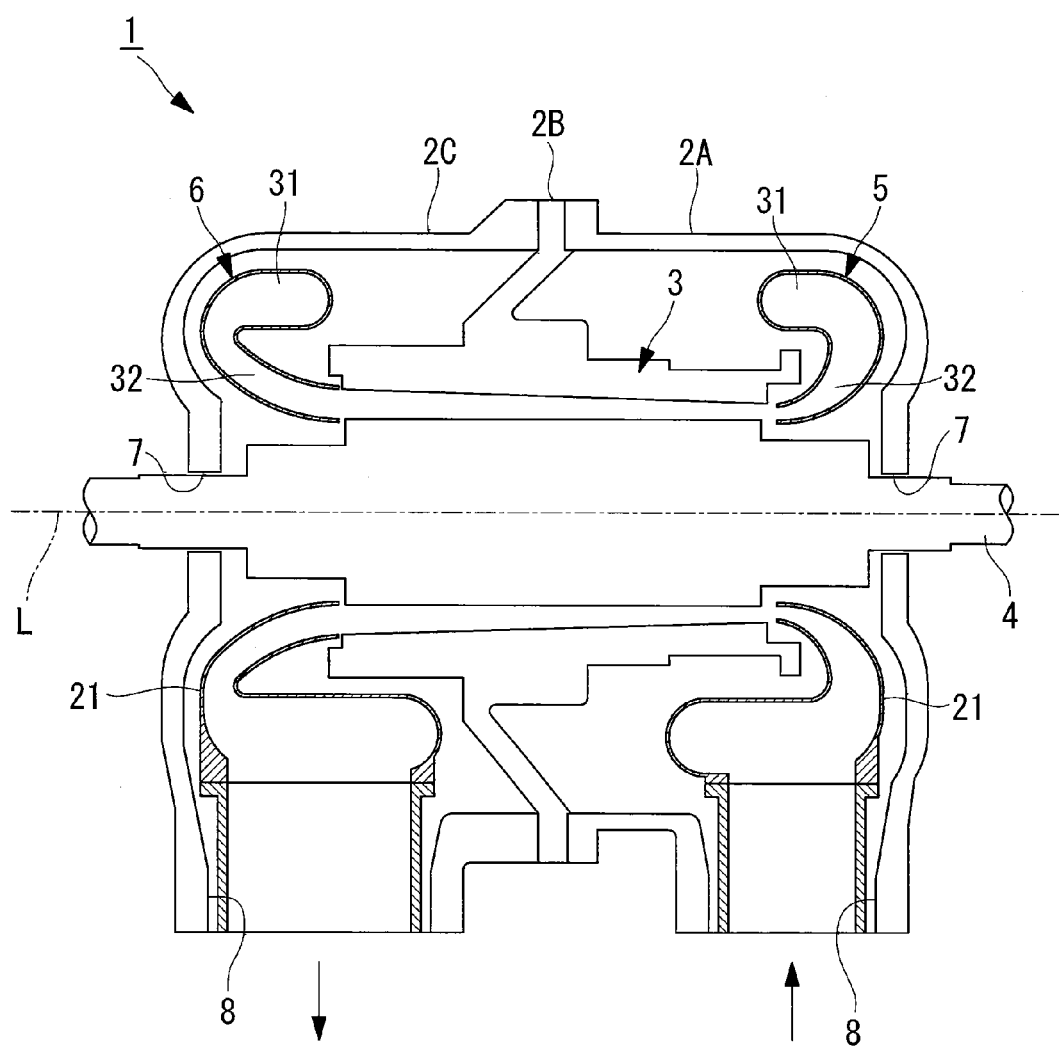
FIG. 1 is a schematic diagram for describing an entire configuration of a gas turbine according to an embodiment of the present invention.

FIG. 1 is a schematic diagram for describing an entire configuration of the gas turbine according to the present embodiment.

As shown in FIG. 1, a gas turbine 1 includes casings 2A, 2B, and 2C constituting an outer shape of the gas turbine 1, a turbine portion 3 which extracts a rotational driving force from a supplied working fluid, a rotation shaft 4 which is rotated and driven around a rotational axis L by the turbine portion 3, an inlet scroll portion (structural member) 5 which supplies the working fluid to the turbine portion 3, and a discharge scroll portion (structural member) 6 into which the working fluid discharged from the turbine portion 3 flows.

As shown in FIG. 1, the casings 2A and 2C constitute the outer shape of the gas turbine 1 together with the casing 2B. The turbine portion 3, the rotation shaft 4, the inlet scroll portion 5, and the discharge scroll portion 6 are accommodated in the casings 2A and 2C. Each of the casings 2A and 2C is a substantially cylindrical member of which one end is closed, in other words, a bottomed cylindrical member, i.e., a pot-like member. The casings 2A and 2C are constituted such that open ends thereof face each other, the casing 2B is sandwiched therebetween, and the casings 2A and 2C are fastened together.

A through hole 7 is formed in the closed ends of the casings 2A and 2C, and the rotation shaft 4 is inserted through the through hole 7. An opening 8 is formed in cylindrical surfaces of the casings 2A and 2C. A tube through which a working fluid flows in or out is inserted into the opening 8.

As shown in FIG. 1, the casing 2B constitutes the outer shape of the gas turbine 1 together with the casings 2A and 2C, and supports the turbine portion 3.

The casing 2B is substantially a disk-like member extending in a radial direction around the rotational axis L. The casing 2B is sandwiched between the casings 2A and 2C.

As shown in FIG. 1, the turbine portion 3 extracts the rotational driving force from the working fluid supplied from the inlet scroll portion 5, and rotates and drives the rotation shaft 4.

A known structure may be used for the turbine portion 3, and the structure thereof is not especially limited.

As shown in FIG. 1, the rotation shaft 4 is rotated and driven around the rotational axis L by the turbine portion 3.

As shown in FIG. 1, the working fluid flows through the inlet scroll portion 5 and the discharge scroll portion 6. The working fluid is supplied to the turbine portion 3 through the inlet scroll portion 5, and the working fluid discharged from the turbine portion 3 flows into the discharge scroll portion 6. Since the basic configurations of the inlet scroll portion 5 and the discharge scroll portion 6 are substantially the same, described herein is the inlet scroll portion 5, and description of the structure of the discharge scroll portion 6 will not be given.

Figure 2:
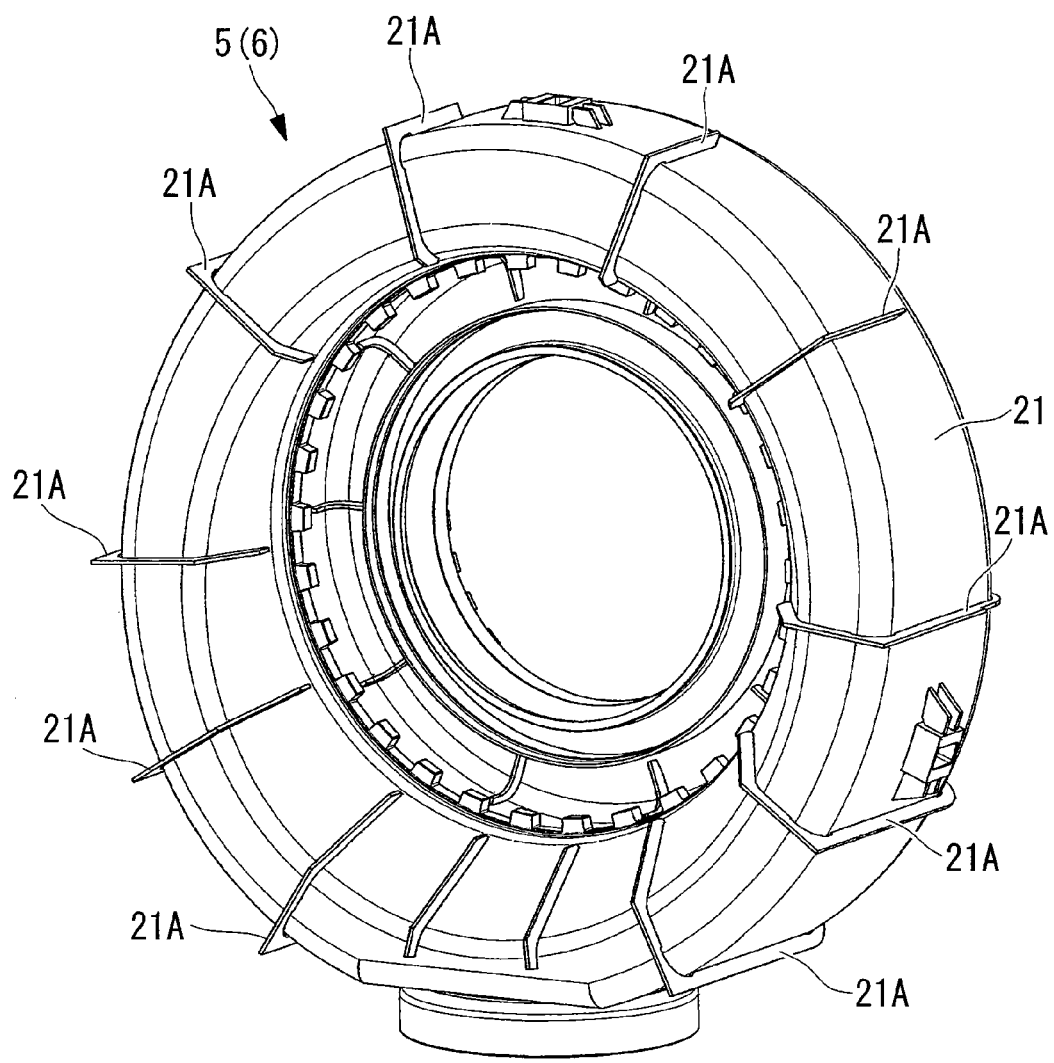
FIG. 2 is a perspective view for describing a configuration of a scroll in an inlet scroll portion shown in FIG. 1 as viewed from a turbine portion.
Figure 3:
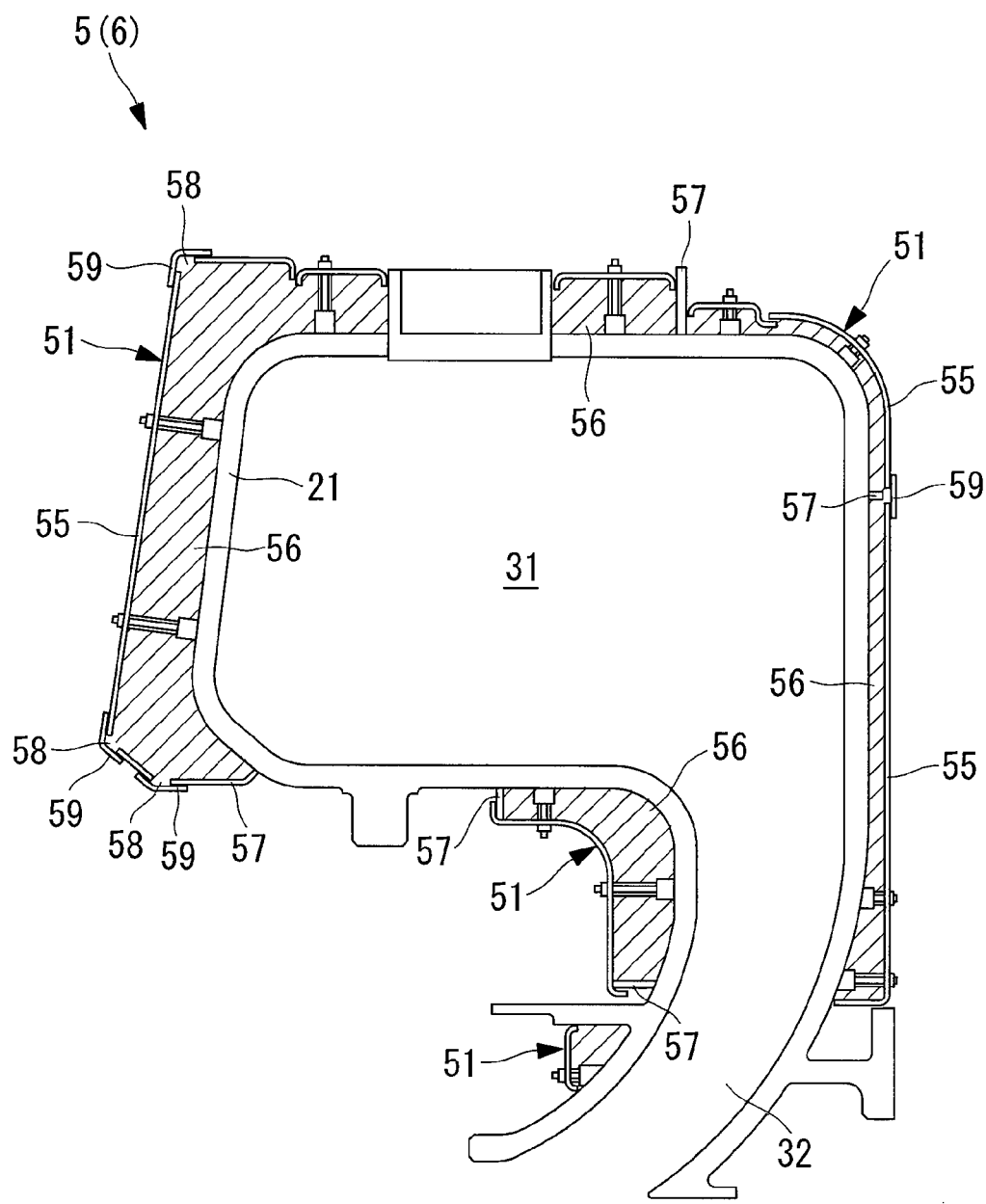
FIG. 3 is a sectional view for describing configurations of the scroll and a thermal insulation structure shown in FIG. 2.

FIG. 2 is a perspective view for describing a structure of a scroll in the inlet scroll portion shown in FIG. 1 as viewed from the turbine portion. FIG. 3 is a sectional view for describing the structures of the scroll and the thermal insulation structure shown in FIG. 2.

As shown in FIGS. 2 and 3, the inlet scroll portion 5 includes a scroll 21 constituting the outer shape of the inlet scroll portion 5, and a thermal insulation structure 51.

As shown in FIGS. 1 and 2, the scroll 21 is integrally formed into a ring shape provided at a central portion thereof with an opening through which the rotation shaft 4 is inserted. As shown in FIG. 1, provided in the scroll 21 are an annular channel (channel) 31 extending annularly around the rotational axis L, and a cylindrical channel (channel) 32 extending from the annular channel 31 toward the turbine portion 3 in the rotational axis L.

As shown in FIG. 2, ribs 21A for ensuring the strength of the scroll 21 are provided on the outer wall of the scroll 21. The ribs 21A extend in the radial direction at portions of the scroll 21 constituting the annular channel 31.

The ribs 21A ensure the strength of the scroll 21 and also prevent a thermal insulation member 56 in the thermal insulation structure 51 from being moved.

Figure 4:
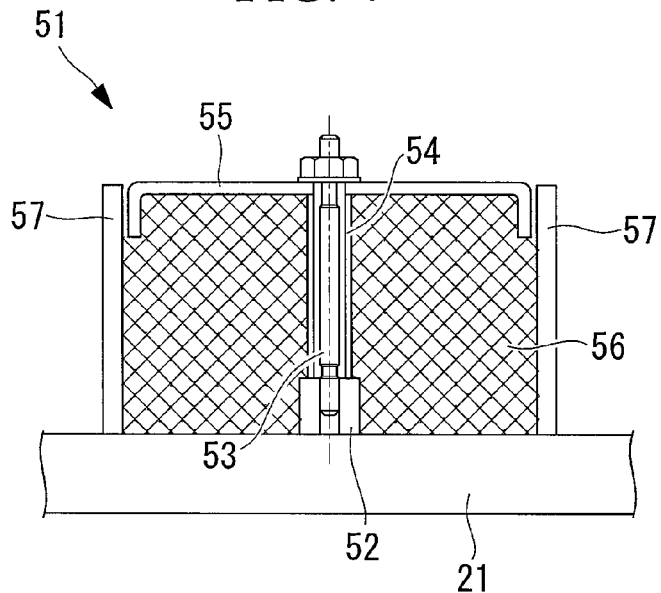
FIG. 4 is a schematic diagram for describing a basic configuration of the thermal insulation structure shown in FIG. 3.
Figure 5:
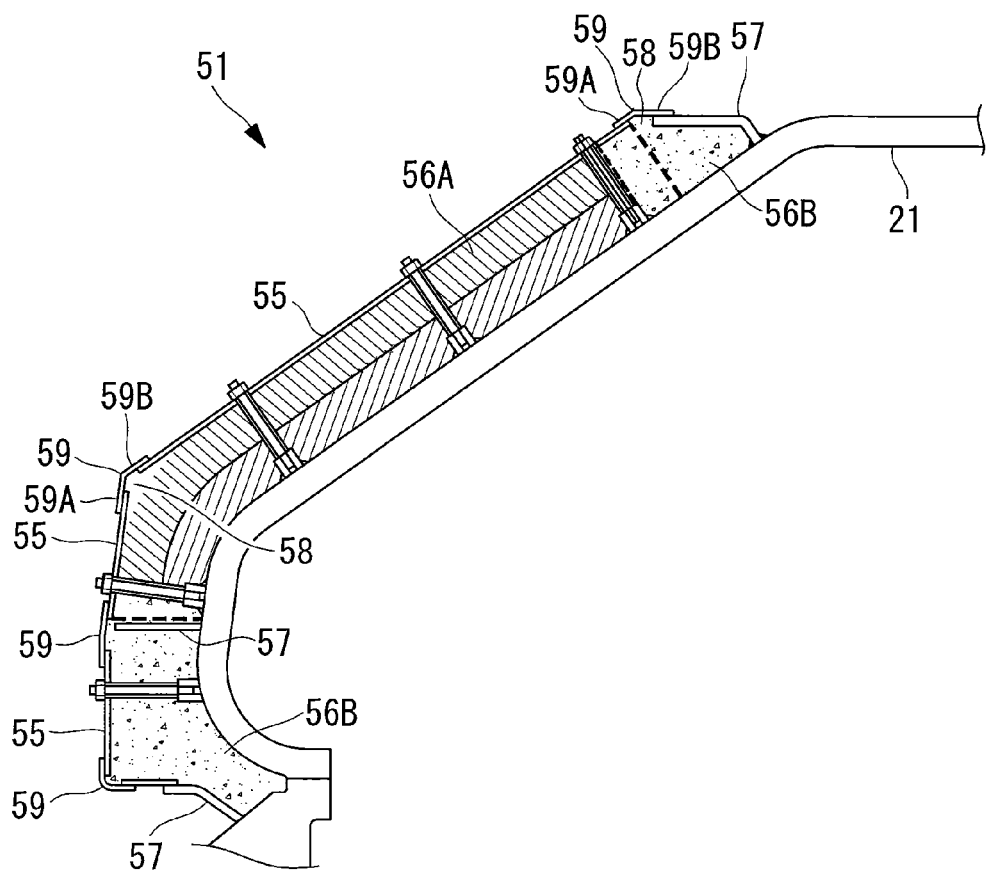
FIG. 5 is a schematic diagram for describing the configuration of the thermal insulation structure shown in FIG. 3.

FIG. 4 is a schematic diagram for describing a basic configuration of the thermal insulation structure shown in FIG. 3. FIG. 5 is a schematic diagram for describing a structure of the thermal insulation structure shown in FIG. 3.

As shown in FIGS. 3 to 5, the thermal insulation structure 51 is disposed on the outer wall of the scroll 21, and prevents heat exchange between the working fluid flowing through the scroll 21 and fluid outside the scroll 21, in other words, the thermal insulation structure 51 blocks heat.

As shown in FIG. 4, the thermal insulation structure 51 includes a boss (securing portion) 52 extending outward from the outer wall of the scroll 21, a stud bolt (securing portion) 53 attached to the boss 52, an adjusting pipe (adjusting portion) 54 covering a periphery of the stud bolt 53 and extending outward, a press plate 55 supported by the adjusting pipe 54 and extending along the scroll 21, a thermal insulation member 56 disposed between the scroll 21 and the press plate 55, and a partition plate 57 extending outward from the scroll 21.

The boss 52 supports the press plate 55 together with the stud bolt 53 and the adjusting pipe 54. The boss 52 projects outward with a distance provided between the boss 52 and the outer wall of the scroll 21.

The boss 52 is provided with a screw hole into which the stud bolt 53 is inserted.

The stud bolt 53 supports the press plate 55 together with the boss 52 and the adjusting pipe 54. A known bolt can be used as the stud bolt 53, and it is not especially limited.

The adjusting pipe 54 supports the press plate 55 together with the boss 52 and the stud bolt 53, and the adjusting pipe 54 adjusts a distance between the scroll 21 and the press plate 55. The adjusting pipe 54 is formed into a substantially cylindrical shape through which the stud bolt 53 is inserted. One end of the adjusting pipe 54 abuts against the boss 52, and the other end abuts against the press plate 55.

The press plate 55 is sandwiched between a nut attached to a tip end of the stud bolt 53 and an end of the adjusting pipe 54. The press plate 55 is thus supported.

As shown in FIGS. 2 to 4, the press plate 55 functions as a lid for forming a space between the press plate 55 and the scroll 21 in which the thermal insulation member 56 is accommodated. The press plate 55 also presses the thermal insulation member 56 against the scroll 21.

The press plate 55 is a substantially flat plate-like member extending along the scroll 21. The plurality of press plates 55 are disposed to have separating portions 58 at predetermined distances from each other with respect to a curved surface region of the scroll 21. The separating portions 58 are provided not only between the press plates 55, but also between the press plate 55 and the rib 21A, and between the press plate 55 and the partition plate 57.

When a thermal extension amount of the scroll 21 and a thermal extension amount of the press plate 55 are different from each other, the separating portion 58 may have a predetermined distance through which the difference between the thermal extension amounts can be absorbed, or may be a predetermined distance through which thermal extension of the press plate 55 itself can be absorbed.

In this configuration, even in a case where the thermal extension amounts are different between the plurality of press plates 55, the difference between the thermal extension amounts can be absorbed by the separating portions 58 of the press plates 55. Further, even in a case where the thermal extension amount of the scroll 21 and the thermal extension amount of the press plate 55 are different from each other, the difference between the thermal extension amounts can be absorbed by the separating portions 58.

The press plates 55 are provided with joint plates 59 disposed to cover the separating portions 58. As shown in FIG. 5 for example, each of the joint plates 59 is fixed such that one end 59A thereof is fixed to adjacent one of the press plates 55 by welding, and the other end 59B of the joint plate 59 can move relative to the other press plate 55 in a direction in which the plate extends.

As shown in FIGS. 3 to 5, the thermal insulation member 56 is disposed between the scroll 21 and the press plate 55, and the thermal insulation member 56 prevents heat exchange between the working fluid flowing through the scroll 21 and fluid outside the scroll 21.

As shown in FIG. 5, a sheet-like thermal insulation member 56A and a bulk-like (e.g., flocculent) thermal insulation member 56B are used as the thermal insulation member 56.

The thermal insulation member 56A is used in a region where the shape of the scroll 21 is relatively smooth, and a plurality of thermal insulation members 56A are laminated and used.

The thermal insulation member 56B is of the flocculent shape which is used in a region where the shape of the scroll 21 is in a curved surface shape or where there exists an end and it is difficult to use the sheet-like thermal insulation member 56A.

The thermal insulation member 56A may be disposed in a region shown in FIG. 5, both ends of the thermal insulation member 56A may extend to locations shown with dotted lines in the drawing, and the disposition region is not especially limited.

As shown in FIGS. 3 to 5, the partition plate 57 is a plate-like member extending outward from the scroll 21, and the partition plate 57 partitions a space where the thermal insulation member 56 is disposed.

The partition plate 57 is used together with the ribs 21A in some cases, and it is not necessary to distinguish the partition plate 57 and the rib 21A from each other in some cases.

Operation in the gas turbine 1 having the above-described configuration will be described next.

As shown in FIG. 1, the working fluid which is heated to high temperature in a high temperature gas furnace flows into the inlet scroll portion 5 of the gas turbine 1. The working fluid which flowed into the inlet scroll portion 5 then flows into the annular channel 31, and flows into the cylindrical channel 32 at a substantially uniform flow rate in the circumferential direction. The working fluid which flowed into the cylindrical channel 32 is introduced toward the turbine portion 3, and flows into the turbine portion 3.

As shown in FIG. 1, in the turbine portion 3, the rotor blade is rotated and driven by the working fluid which flowed into the turbine portion 3, and a rotational driving force extracted by the rotor blade is transmitted to the rotation shaft 4. The working fluid of which rotational driving force was extracted by the turbine portion 3 and of which temperature was lowered is discharged from the turbine portion 3.

As shown in FIG. 1, the working fluid discharged from the turbine portion 3 flows into the cylindrical channel 32 of the discharge scroll portion 6, and flows toward the annular channel 31. The working fluid which flowed into the annular channel 31 is discharged from the discharge scroll portion 6, i.e., from the gas turbine 1, and is again introduced into the high temperature gas furnace through each device.

According to the above structure, the thermal insulation members 56A and 56B are disposed outside the scroll 21, and the thermal insulation members 56A and 56B are sandwiched between the press plate 55 and the outer wall of the scroll 21.

Therefore, as compared with a case where the thermal insulation structure 51 is disposed inside the scroll 21, it becomes easier to attach the thermal insulation structure 51. Further, the working fluid flowing through the scroll 21 and the thermal insulation structure 51 do not come into contact with each other. Therefore, drop of the thermal insulation structure 51 caused by flow of the working fluid can be prevented. Thus, the thermal insulation structure can be easily used even in an integrally constructed scroll 21, and reliability and thermal insulation properties can be ensured.

The distance between the press plate 55 and the outer wall of the scroll 21 is adjusted by adjusting the position of the press plate 55 mounted with respect to the stud bolt 53. Thus, it becomes easy to adjust the thickness of the thermal insulation structure 51.

Further, the distance between the press plate 55 and the outer wall of the scroll 21 can easily be determined using the adjusting pipe 54. Thus, it becomes easier to adjust the thickness of the thermal insulation structure 51.

By providing the plurality of same adjusting pipes 54, the distances between the press plates 55 and the outer wall of the scroll 21 at the location where the adjusting pipes 54 are disposed can easily be equally set.

Since the gap where the thermal insulation members 56A and 56B are disposed is defined by the partition plate 57, movement and deviation of the thermal insulation members 56A and 56B caused by their own weights can be suppressed.

The technical scope of the present invention is not limited to the above embodiment, and the present invention can variously be modified within a range not departing from the subject matter of the present invention.

For example, although the present invention is applied to the axial-flow turbine in the above embodiment, the present invention is not limited to the axial-flow turbine, but can also be applied to other kinds of turbines such as a centrifugal type turbine and a mixed-flow turbine.

The present invention can also be applied to gas turbines of other types such as a gas turbine in which air is used as a working fluid and combustion energy of fossil fuel or the like is used as a heat source. The invention can be applied not only to a fluid machine such as a steam turbine, but also to any kinds of structural members in which it is necessary to construct a thermal insulation structure, and the structural member is not especially limited.

The invention claimed is:

1. A thermal insulation structure for a structural member, comprising:
    a securing portion extending outward from an outer wall of the structural member;
    a press plate whose mounting position with respect to the securing portion is adjustable, and that is attached to the securing portion, with a gap between the press plate and the outer wall; and
    a thermal insulation member disposed between the outer wall and the press plate.

2. A thermal insulation structure for a structural member according to claim 1, wherein an adjusting portion, disposed between the outer wall and the press plate, is provided for defining the gap between the outer wall and the press plate by supporting the press plate from the outer wall side thereof.

3. A thermal insulation structure for a structural member according to claim 1, further comprising a plurality of press plates each having a configuration equal to that of said press plate, wherein
    the plurality of press plates are disposed with ends thereof separated from each other and are capable of moving relative to each other in the direction in which the press plates extend.

4. A thermal insulation structure for a structural member according to claim 1, further comprising a partition plate extending toward the outside from the outer wall of the structural member.

5. A scroll structure comprising:
    a scroll having a channel through which a working fluid flows in the interior thereof; and
    a thermal insulation structure according to claim 1.

6. A thermal insulation structure for a structural member according to claim 2, wherein,
    the secure portion comprises a boss and a stud bolt attached to the boss; and
    one end of the adjusting portion abuts against the boss, and the other end abuts against the press plate.

* * * * *

UNITED STATES PATENT AND TRADEMARK OFFICE
CERTIFICATE OF CORRECTION

PATENT NO.       : 8,613,589 B2                                    Page 1 of 1
APPLICATION NO. : 12/747285
DATED            : December 24, 2013
INVENTOR(S)      : Yamashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this
Twenty-second Day of September, 2015

Michelle K. Lee
*Director of the United States Patent and Trademark Office*